United States Patent
Takagi et al.

(10) Patent No.: US 8,744,016 B2
(45) Date of Patent: Jun. 3, 2014

(54) RECEIVING APPARATUS AND RECEIVING METHOD

(75) Inventors: Hiroaki Takagi, Yokohama (JP); Naoto Adachi, Yokohama (JP); Masataka Umeda, Kawasaki (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 152 days.

(21) Appl. No.: 13/442,572

(22) Filed: Apr. 9, 2012

(65) Prior Publication Data

US 2012/0307944 A1 Dec. 6, 2012

(30) Foreign Application Priority Data

May 30, 2011 (JP) .................................. 2011-120334

(51) Int. Cl.
*H04L 27/06* (2006.01)

(52) U.S. Cl.
USPC ........... 375/340; 375/260; 375/346; 375/354; 375/371; 455/296; 455/501; 455/502; 455/516; 370/210; 370/344; 370/480; 370/503; 370/508; 370/516; 327/141; 327/163; 327/551

(58) Field of Classification Search
USPC .......... 375/260, 340, 346, 354, 371; 455/296, 455/501, 502, 516; 370/210, 344, 480, 503, 370/508, 516; 327/141, 163, 551
See application file for complete search history.

(56) References Cited

U.S. PATENT DOCUMENTS

| | | | |
|---|---|---|---|
| 2009/0221254 A1* | 9/2009 | Kawauchi et al. ............ | 455/296 |
| 2009/0279647 A1* | 11/2009 | Kanno .......................... | 375/345 |
| 2009/0285086 A1 | 11/2009 | Adachi | |

FOREIGN PATENT DOCUMENTS

| | | |
|---|---|---|
| JP | 2000-295195 | 10/2000 |
| JP | 2004-266814 | 9/2004 |
| JP | 2009-278448 | 11/2009 |
| JP | 2010-268177 | 11/2010 |

* cited by examiner

*Primary Examiner* — Leon Flores
(74) *Attorney, Agent, or Firm* — Fujitsu Patent Center

(57) ABSTRACT

A receiving apparatus includes a symbol timing detection unit, a Fourier transform unit, a first symbol timing correction unit, and an interpolation synthesis unit. The symbol timing detection unit is configured to detect a Fourier transform start position from a received transmitting signal of a symbol unit, the Fourier transform unit is configured to perform a Fourier transform using the detected Fourier transform start position. The first symbol timing correction unit is configured to calculate and correct an amount of change between the Fourier transform start position of a reference symbol and the detected Fourier transform start position, and the interpolation synthesis unit is configured to perform an interpolation synthesis of a plurality of delay profiles corresponding to a plurality of symbols including the reference symbol and a symbol in which the amount of change is corrected.

13 Claims, 11 Drawing Sheets

FIG.2A SYMBOL n
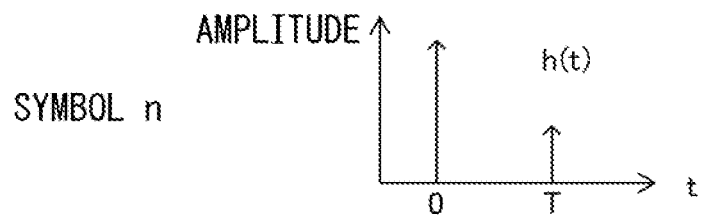
FIG.2B SYMBOL n-1
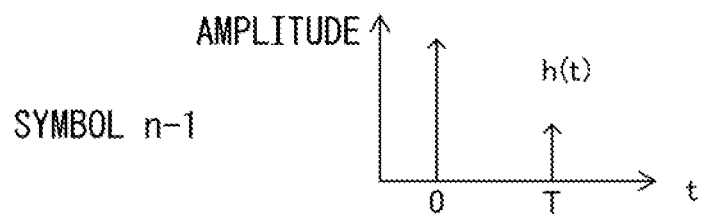
FIG.2C SYMBOL n-2
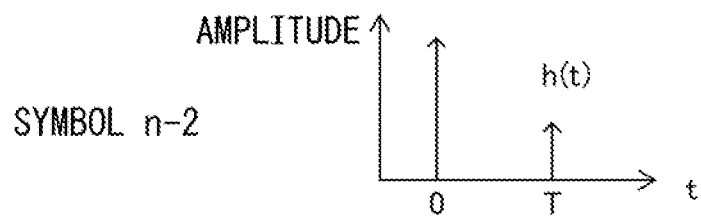
FIG.2D SYMBOL n-3
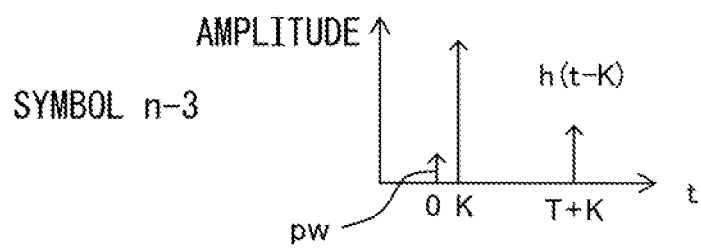
FIG.2E AFTER SYNTHESIS
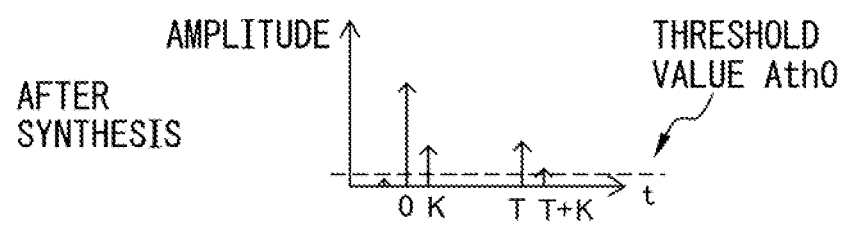

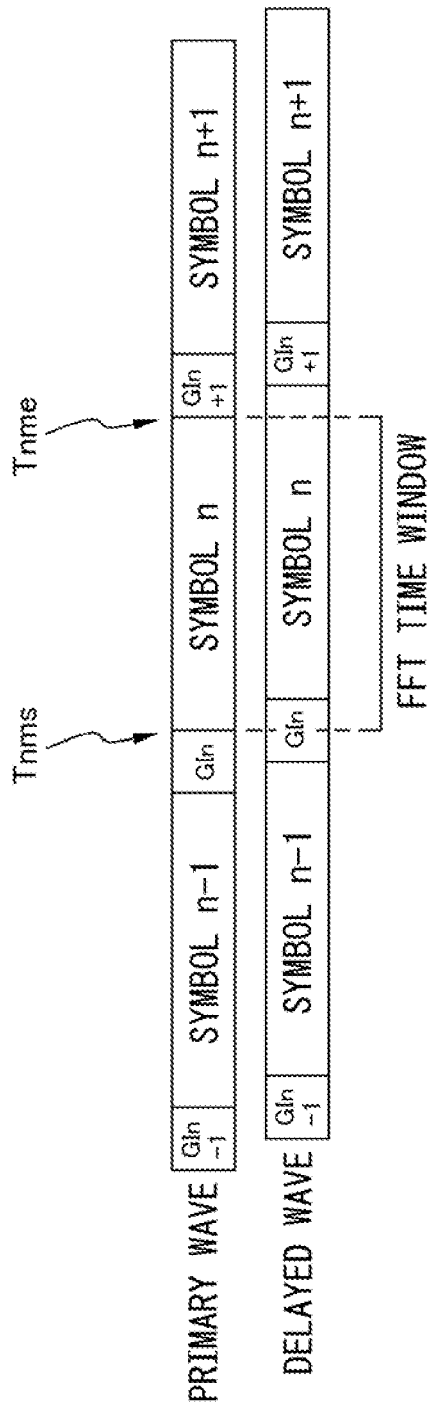

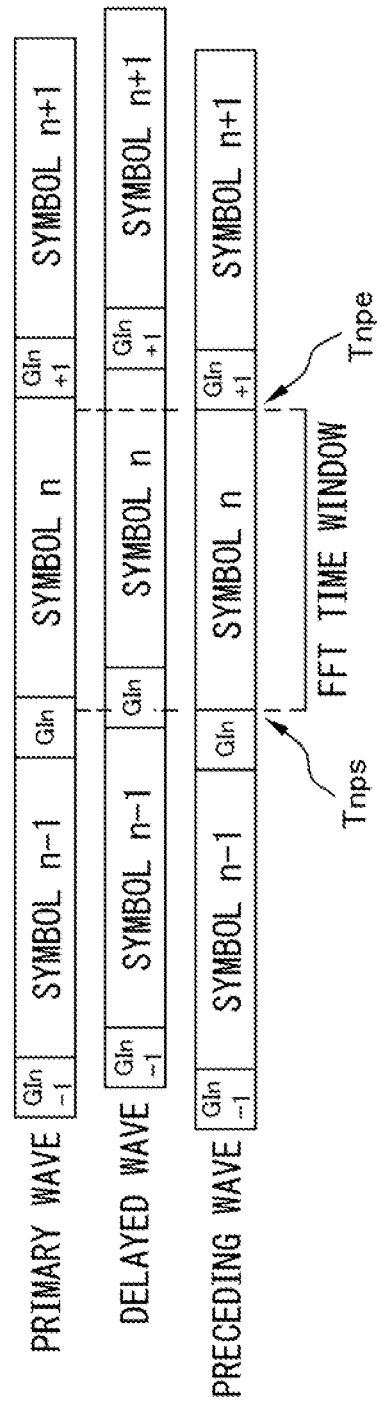

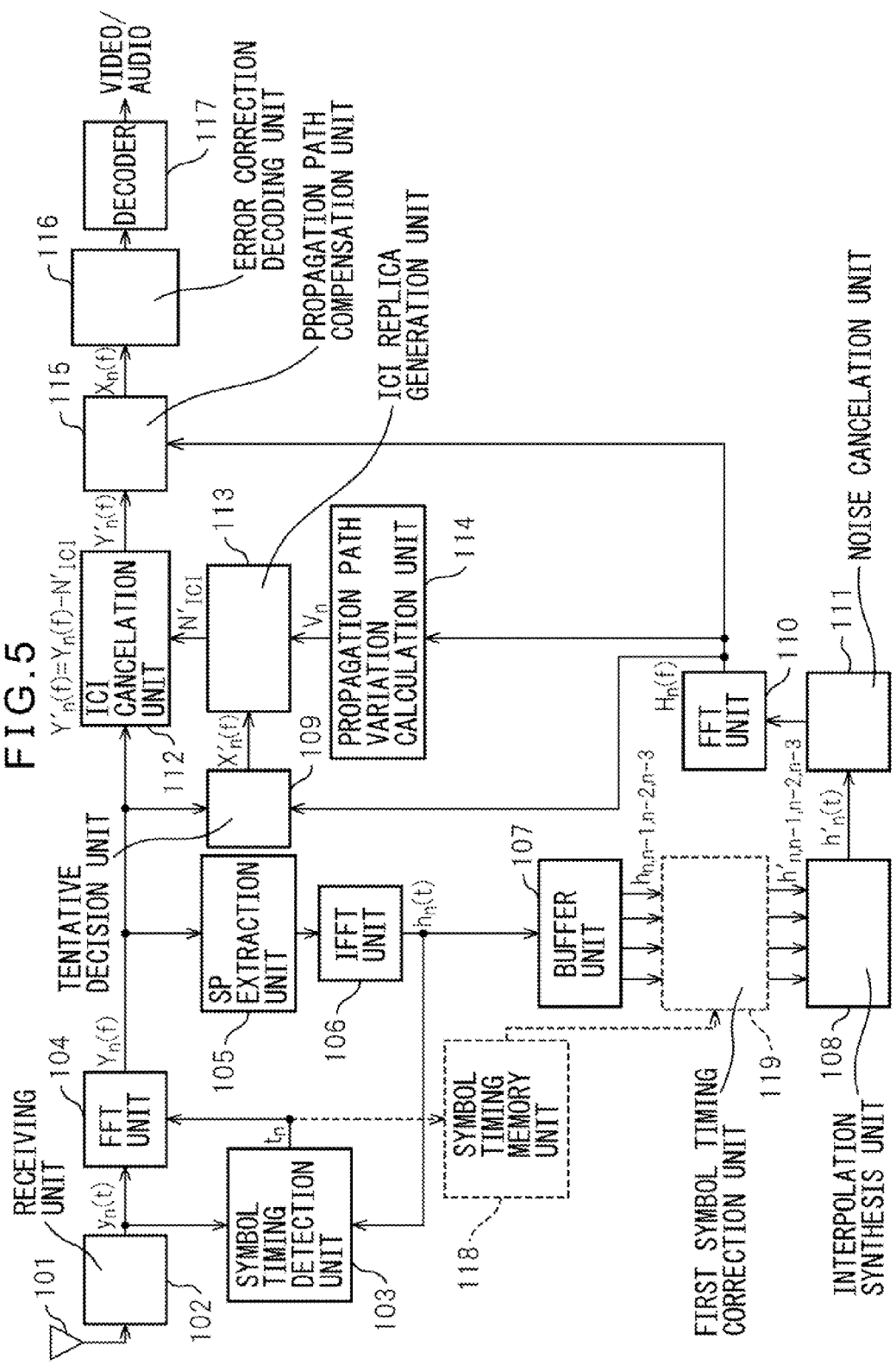

FIG.6A SYMBOL n
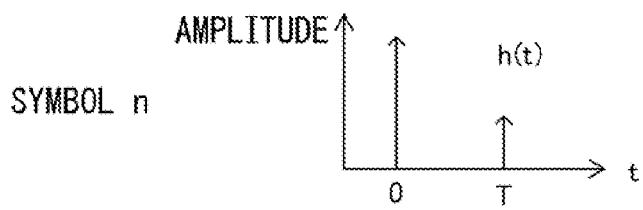
FIG.6B SYMBOL n-1
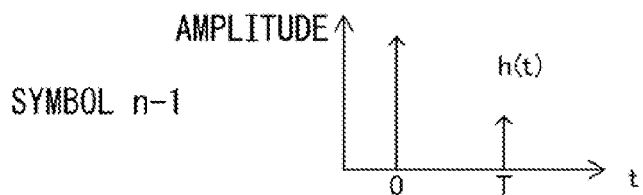
FIG.6C SYMBOL n-2
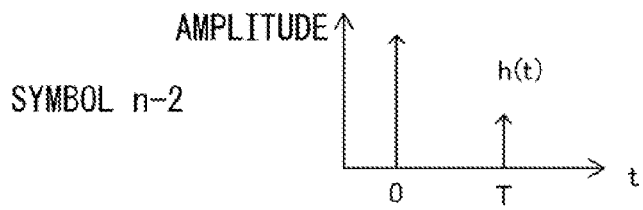
FIG.6D SYMBOL n-3
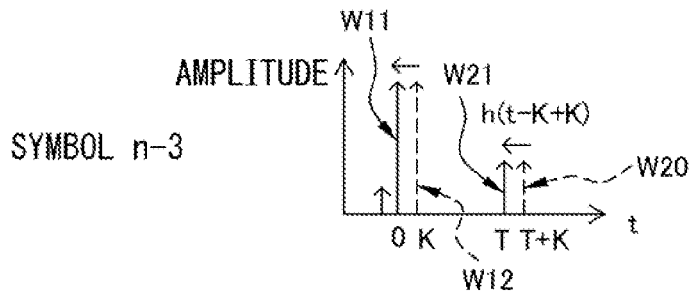
FIG.6E AFTER SYNTHESIS
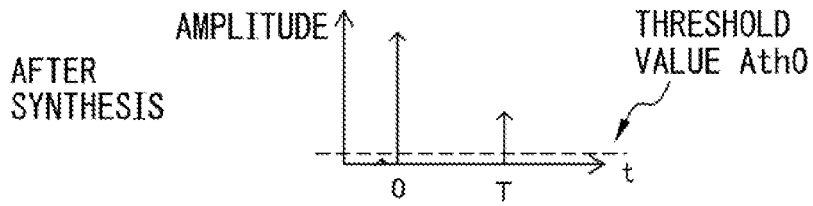

FIG.7

| SYMBOL NUMBER | SYMBOL TIMING |
|---|---|
| n+3 | K |
| n+2 | K |
| n+1 | K |
| n | K |
| n−1 | 0 |
| n−2 | 0 |
| n−3 | 0 |
| n−4 | 0 |

SYNTHESIS AREA AT TIME n+2 (SA2)

SYNTHESIS AREA AT TIME n+1 (SA1)

SYNTHESIS AREA AT TIME n (SA0)

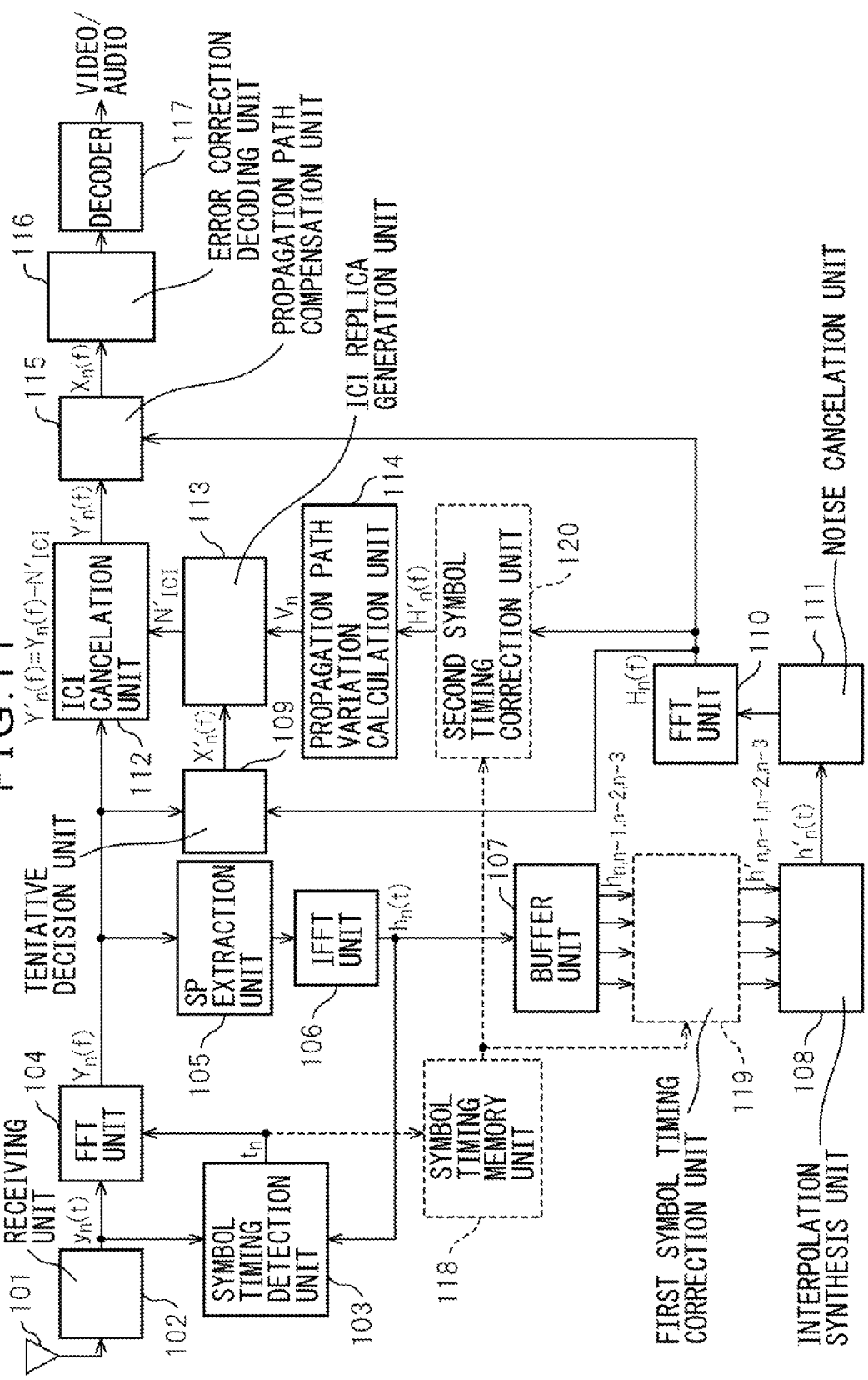

RECEIVING APPARATUS AND RECEIVING METHOD

CROSS REFERENCE TO RELATED APPLICATION

This application is based upon and claims the benefit of priority of the prior Japanese Patent Application No. 2011-120334, filed on May 30, 2011, the entire contents of which are incorporated herein by reference.

FIELD

The embodiments discussed herein are related to a receiving apparatus and receiving method.

BACKGROUND

Modulation in a transmitting apparatus for digital broadcast (for example, terrestrial digital broadcast in Japan) first maps a bit stream of a transmitting signal onto a complex plane through a mapping process. For example, in 64QAM (Quadrature Amplitude Modulation), a bit stream of a transmitting signal is segmented every 6 bits and mapped to 64 signal points on a complex plane.

Furthermore, in OFDM (Orthogonal Frequency-Division Multiplexing), the data (signal) mapped to 64 signal points on a complex plane is subjected to the IFFT (Inverse Fast Fourier Transform). Then, the digital signal having been subjected to the IFFT is converted to an analog signal, and then up-converted to a desired frequency and transmitted from an antenna.

On the other hand, demodulation in a receiving apparatus for terrestrial digital broadcast implements the opposite process to the above-described modulation. That is to say, an analog signal received by an antenna is converted to a digital signal, and furthermore, in OFDM, subjected to the FFT (Fast Fourier Transform) and propagation path compensation.

Then, the signal after propagation path compensation is subjected to error correction and decoding and output as a TS (Transform Stream) format signal, and a video/audio signal is output by decoding this TS signal. As described above, for example, although the Fourier Transform is used in a receiving apparatus for terrestrial digital broadcast, it is known that the optimal position of the time window in the Fourier Transform (the FFT time window position) varies depending on the environment.

However, moving the FFT time window position causes deterioration of propagation path compensation for a certain period of time, resulting in degraded reception performance.

Also, in order to cancel ICI (Inter-Carrier Interference), for example, a propagation path variation value is calculated from the propagation path estimation values of earlier and later symbols upon calculation of ICI, but phase rotation is occurred for propagation path estimation values if the FFT time window position is changed.

In this way, when finding a propagation path variation value from propagation path estimation values of varying FFT time window positions, the propagation path variation value is not calculated correctly, and therefore the accuracy of ICI cancellation deteriorates and reception performance degrades.

Now, various receiving apparatuses for digital broadcast have been proposed heretofore.

In the related art, there have been proposed various kinds of receiving apparatuses for digital broadcast.

Patent Document 1: Japanese Laid-open Patent Publication No. 2004-266814
Patent Document 2: Japanese Laid-open Patent Publication No. 2000-295195
Patent Document 3: Japanese Laid-open Patent Publication No. 2009-278448
Patent Document 4: Japanese Laid-open Patent Publication No. 2010-268177

SUMMARY

According to an aspect of the embodiments, there is provided a receiving apparatus including a symbol timing detection unit, a Fourier transform unit configured to perform a Fourier transform using the detected Fourier transform start position, a first symbol timing correction unit, and an interpolation synthesis unit.

The symbol timing detection unit is configured to detect a Fourier transform start position from a received transmitting signal of a symbol unit, the Fourier transform unit is configured to perform a Fourier transform using the detected Fourier transform start position.

The first symbol timing correction unit is configured to calculate and correct an amount of change between the Fourier transform start position of a reference symbol and the detected Fourier transform start position, and the interpolation synthesis unit is configured to perform an interpolation synthesis of a plurality of delay profiles corresponding to a plurality of symbols including the reference symbol and a symbol in which the amount of change is corrected.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 2A, FIG. 2B, FIG. 2C, FIG. 2D and FIG. 2E are drawings schematically illustrating interpolation synthesis, including change of the FFT time window position in a receiving apparatus according to related art;

FIG. 3 is a drawing for explaining FFT time window control under multipath environment (pattern 1);

FIG. 4 is a drawing for explaining FFT time window control under a multipath environment (pattern 2);

FIG. 5 is a block diagram illustrating a receiving apparatus according to the first embodiment;

FIG. 6A, FIG. 6B, FIG. 6C, FIG. 6D and FIG. 6E are drawings schematically illustrating interpolation synthesis, including change of the FFT time window position in a receiving apparatus according to the present embodiment;

FIG. 7 is a drawing illustrating examples of symbol timings held in a symbol timing memory unit;

FIG. 11 is a block diagram illustrating a receiving apparatus according to a third embodiment.

DESCRIPTION OF EMBODIMENTS

Before describing the embodiments of a receiving apparatus and receiving method in detail, a receiving apparatus according to related art and its problems will be explained with reference to FIG. 1, FIG. 2, FIG. 3 and FIG. 4.

Figure 1:
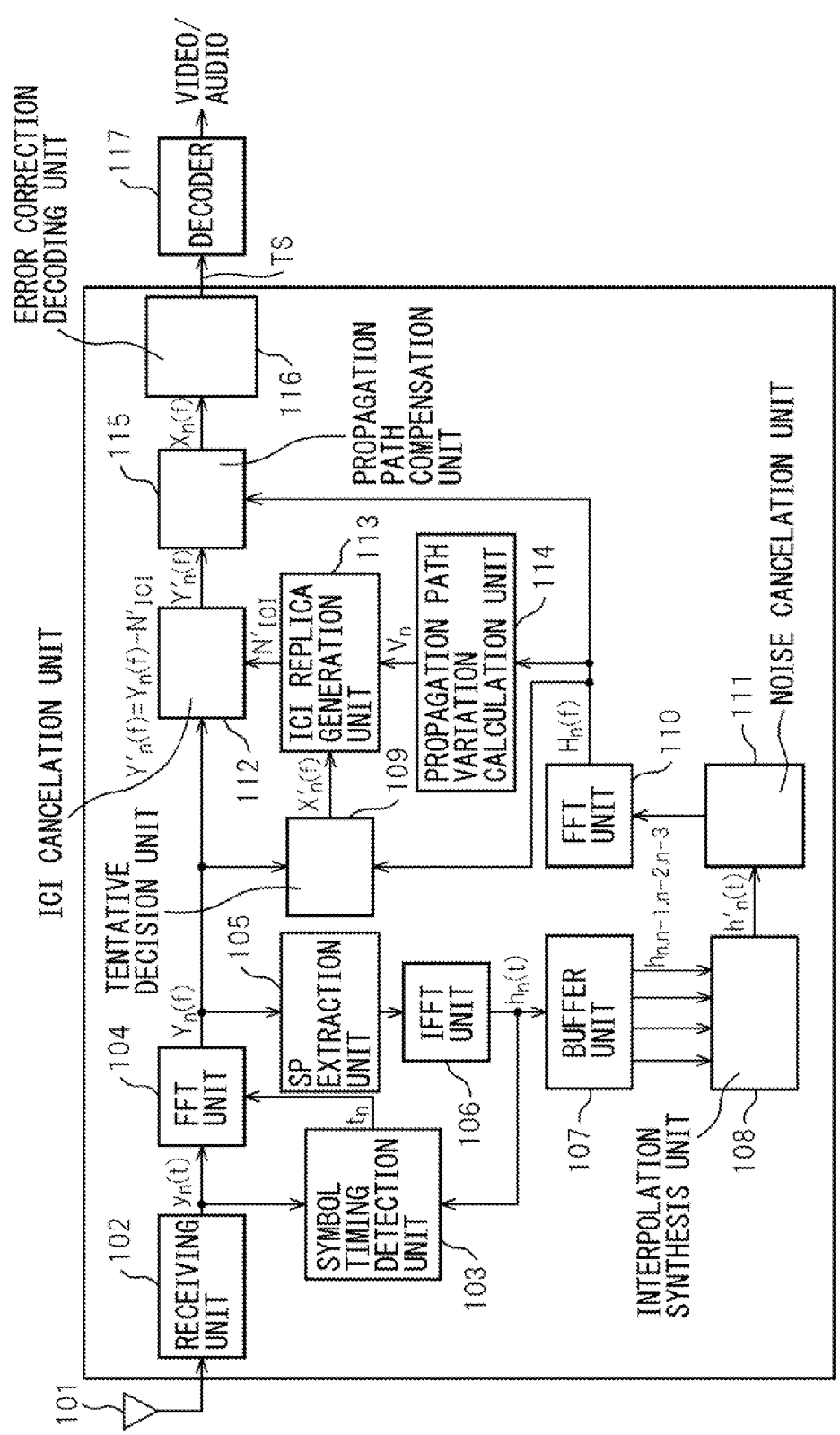
FIG. 1 is a block diagram illustrating an example of a receiving apparatus according to related art.

FIG. 1 is a block diagram illustrating an example of a receiving apparatus according to related art, and illustrates a receiving apparatus that complies with the terrestrial digital broadcast in Japan (ISDB-T: Integrated Service Digital Broadcasting-Terrestrial). As illustrated in FIG. 1, the receiving apparatus according to related art includes a receiving unit 102, a symbol timing detection unit 103, an FFT unit 104, an SP extraction unit 105, an IFFT unit 106, a buffer unit 107, and an interpolation synthesis unit 108.

Furthermore, the receiving apparatus includes a tentative decision unit 109, an FFT unit 110, a noise cancelation unit 111, an ICI cancelation unit 112, an ICI replica generation unit 113, a propagation path variation calculation unit 114, a propagation path compensation unit 115, an error correction decoding unit 116 and a decoder 117.

The receiving unit 102 selects a channel to receive from a high frequency signal received through the antenna 101, and performs an A/D (Analog/Digital) conversion of the high frequency signal of the selected channel via intermediate frequency and outputs digital signal $y_n(t)$.

Digital signal $y_n(t)$ output from the receiving unit 102 is input in the symbol timing detection unit 103 and FFT unit 104. That is to say, the symbol timing detection unit 103 receives digital signal $y_n(t)$ from the receiving unit 102 and time domain signal $h_n(t)$ from the IFFT unit 106 (described later), and, by detecting the head of the symbols, determines the FFT time window position (the Fourier Transform time window position).

Here, the detection of the head of the symbols uses the correlation of guard intervals, in which information of the tail end parts of symbols are copied and inserted. By this means, the FFT time window is determined from the symbol start timing of the primary wave. Note that the symbol start timing is determined when reception starts, and, after that, optimal FFT time window positions that do not generate inter-symbol interference are determined from delay profiles ($h_n(t)$) that is generated in the IFFT unit 106.

That is to say, according to timing $t_n$ (symbol timing detection value) detected in the symbol timing detection unit 103, the FFT unit 104 converts a received signal into frequency domain signal $Y_n(f)$ through the FFT and outputs frequency domain signal $Y_n(f)$.

The SP extraction unit 105 extracts, for example, an SP (Scattered Pilot) signal, which is a known signal transmitted with a data signal in ISDB-T, from frequency domain signal $Y_n(f)$ converted in the FFT unit 104. The IFFT unit 106 converts the SP signal into a time domain signal $h_n(t)$ representing a delay profile, through the IFFT (Inverse Fast Fourier Transform).

The amplitude of this converted time domain signal $h_n(t)$ represents the magnitude of the received signal, so that the greatest signal represents the primary wave and signals greater than a certain level represent interference waves. Here, the SP signal is converted into the time domain, so that the interference wave may be determined as preceding wave and delayed wave as opposed to the primary wave.

By the way, cases may occur where signals other than transmitting signals appear in delay profiles (time domain signals $h_n(t)$, $h_{n-1}(t)$, $h_{n-2}(t)$ and $h_{n-3}(t)$) due to the noise generated from the environment. The buffer unit 107 holds symbols for a certain period of time to reduce this deterioration of accuracy of delay profiles due to the noise.

The interpolation synthesis unit 108 synthesizes delay profiles $h_n(t)$, $h_{n-1}(t)$, $h_{n-2}(t)$ and $h_{n-3}(t)$ held in the buffer unit 107 by finding an arithmetic mean (arithmetic mean synthesis), and outputs delay profile $h'_n(t)$ synthesized by way of an arithmetic mean. The noise cancelation unit 111 receives delay profile $h'_n(t)$ from the interpolation synthesis unit 108, and, based on a certain threshold value, determines signals that equal or fall below the threshold value as noise and replaces them with zeros.

By this means, it is possible to reduce the influence of noise and perform propagation path estimation accurately. Furthermore, a delay profile having been subjected to noise cancelation is again subjected to the FFT in the FFT unit 110 and converted into frequency domain signal $H_n(f)$, and a propagation path estimation value is obtained.

By the way, for example, ICI that is produced upon reception during move is known to deteriorate reception performance significantly. The ICI cancelation unit 112 estimates ICI components based on the propagation path estimation value acquired from the data signal, and cancels the ICI of each carrier by subtracting an ICI replica.

That is to say, the tentative decision unit 109 receives frequency domain signal $Y_n(f)$ from the FFT unit 104 and frequency domain signal $H_n(f)$ from the FFT unit 110, and outputs each carrier's hard decision value $X'_n(f)$, which is used when generating an ICI replica.

Also, the propagation path variation calculation unit 114 calculates propagation path variation value $V_n$ using propagation path information ($H_n(f)$) of the earlier and later symbols, and, furthermore, the ICI replica generation unit 113 generates ICI replica $N'_{ICI}$ from hard decision value $X'_n(f)$ and propagation path variation value $V_n$.

Then, the ICI cancelation unit 112 estimates ICI components from the propagation path estimation value acquired from the data signal, and cancels the ICI of each carrier by subtracting ICI replica $N'_{ICI}$. That is to say, frequency domain signal $Y'_n(f)$ from which ICI is cancelled is found as $Y'_n(f)=Y_n(f) -N'_{ICI}$, and this is output to the propagation path compensation unit 115.

The propagation path compensation unit 115 performs a complex division of received data signal ($Y'_n(f)$) subjected to ICI cancelation in the ICI cancelation unit 112 by the propagation path estimation value and, this causes to cancel the influence of the propagation path and to obtain equalized data signal $X_n(f)$.

This equalized data signal $X_n(f)$ is given to the error correction decoding unit 116, where error correction and decoding process are executed, and a TS (Transform Stream) format signal is output. Then, the TS signal is input in the decoder 117, converted to a video/audio signal and output.

FIG. 2A, FIG. 2B, FIG. 2C, FIG. 2D and FIG. 2E are drawings schematically illustrating interpolation synthesis, including change of the FFT time window position in a receiving apparatus according to related art. Here, FIG. 2A, FIG. 2B, FIG. 2C and FIG. 2D illustrate symbol n to symbol n-3, and, also, FIG. 2E illustrates what symbol n to symbol n-3 are synthesized.

First, as illustrated in FIG. 2A, FIG. 2B and FIG. 2C, in symbols n, n-1 and n-2, there are not preceding waves, and a delay profile coordinating the FFT time window position with the primary wave is provided. On the other hand, as illustrated in FIG. 2D, in symbol n-3, there is preceding wave pw. That is to say, the preceding wave of symbol n–3 is deviated by K, in terms of the number of FFT sampling, for example.

Consequently, as illustrated in FIG. 2E, when delay profiles with different FFT time window positions are subjected to arithmetic mean synthesis in the interpolation synthesis unit 108, the primary wave and delayed waves, which originally are the same signal, are synthesized separately.

Then, the noise cancelation unit 111 uses, for example, certain threshold value Ath0, cancels noise including interference waves by replacing paths that equal or fall below that threshold value with "0" (zero), and makes possible accurate propagation path estimation.

However, as mentioned above, when delay profiles of different FFT time window positions are synthesized, for example, the accuracy of noise cancellation deteriorates in the position of +K, which is the change of the FFT time window position, and the accuracy of propagation path estimation deteriorates.

In the event of mode 3 of ISDB-T in the FFT sampling time unit, for example, the FFT clock is the number of FFT sampling/effective symbol length=8192/1008=8.126984 MHz, so that the time of that change is its inverse, which is 63/512=0.123047 µs unit.

FIG. 3 and FIG. 4 are drawings for explaining FFT time window control under a multipath environment, where FIG. 3 illustrates a case with two waves, namely the primary wave and a delayed wave, and FIG. 4 illustrates a case with three waves, namely the primary wave, a delayed wave and a preceding wave.

First, as illustrated in FIG. 3, in the event there are two waves of the primary wave and a delayed wave, the FFT time window lasts from Tnms, which is the start timing of symbol n of the primary wave, to Tnme, which is the end timing of symbol n of the primary wave.

Also, as illustrated in FIG. 4, in the event there are three waves of the primary wave, a delayed wave and a preceding wave, the FFT time window lasts from Tnps, which is the start timing of symbol n of the preceding wave, to Tnpe, which is the end timing of symbol n of the preceding wave.

By this means, the FFT time window position is determined such that data of different symbol numbers does not exist in that FFT time window, and, so that, for example, inter-symbol interference is not produced in the presence of multiple paths.

By the way, as explained with reference to FIG. 1, with a receiving apparatus according to related art, the SP extraction unit 105 extracts the pilot (SP) signal, which is a known signal, from the received signal after the FFT in the FFT unit 104.

Furthermore, the IFFT unit 106 calculates a delay profile by performing an inverse Fourier Transform, the noise cancelation unit 111 cancels interference waves that equal or fall below a threshold value from this delay profile, and the FFT unit 110 performs an FFT again and calculates a propagation path estimation value.

Here, with the receiving apparatus of related art, to suppress signals on the delay profile that are produced by the influence of noise in order to improve the accuracy of the propagation path estimation value, the buffer unit 107 and interpolation synthesis unit 108 perform an arithmetic mean synthesis.

When this takes place, if the FFT time window position in the initial stage in the FFT unit 104 moves, the delay profile to be calculated shifts in the time direction, thus a time lag is created. Performing an arithmetic mean synthesis with delay profiles including such change in the time direction results in a fall in the accuracy of interference wave cancelation and deterioration of the accuracy of the propagation path estimation value. That is to say, the propagation path compensation unit 115 becomes unable to perform propagation path compensation sufficiently, which then results in degradation of reception performance.

Also, to remove ICI (Inter-Carrier Interference), the tentative decision unit 109, the propagation path variation calculation unit 114, the ICI replica generation unit 113 and the ICI cancelation unit 112 are provided. That is to say, ICI components are estimated from the propagation path estimation value acquired from the data signal, and, by subtracting an ICI replica, the ICI of each carrier is cancelled.

However, with the receiving apparatus of related art, changing the FFT time window position causes phase rotation for propagation path estimation values. That is to say, when finding a propagation path variation value from propagation path estimation values of varying FFT time window positions, the propagation path variation value is not calculated correctly, and therefore the accuracy of ICI cancellation deteriorates. That is, the ICI cancellation unit 112 becomes unable to perform ICI cancellation sufficiently, which results in degradation of reception performance.

Now, embodiments of a receiving apparatus and a receiving method will be described below in detail with reference to the accompanying drawings. FIG. 5 is a block diagram illustrating a receiving apparatus according to the first embodiment, and illustrates a receiving apparatus that complies with the terrestrial digital broadcast in Japan (ISDB-T).

As clear from the comparison of FIG. 5 and FIG. 1 described earlier, the receiving apparatus of this first embodiment adds a symbol timing memory unit 118 and a first symbol timing correction unit 119 to the receiving apparatus of related art illustrated in FIG. 1.

The symbol timing memory unit 118 holds symbol timing detection value to detected in the symbol timing detection unit 103 with the symbol numbers. Note that the symbol timing detection unit 103 detects the FFT time window position in the FFT sampling time unit.

That is to say, given the change of symbol timing detection positions and the multipath environment, the optimal position for the FFT time window position varies per symbol, to reduce inter-symbol interference as much as possible.

Consequently, the symbol timing detection unit 103 determines the optimal FFT time window position, in the FFT sampling time unit, per symbol, from delay profile $h_n(t)$ generated in the IFFT unit 106.

The symbol timing memory unit 118 stores symbol timing detection value $t_n$ in a shift register, per symbol, for the value of the difference from the start of reception. That is to say, symbol timing detection values $t_n$ for the number of symbols subject to arithmetic mean synthesis (for example, four symbols) are held in the symbol timing memory unit 118.

The SP extraction unit 105 extracts the SP signal from the output data ($Y_n(f)$) of the FFT unit 104, and, the IFFT unit 106 performs an IFFT in, for example, 8192 points, which is the same as the number of FFT sampling.

The output of the IFFT unit 106 is held in the buffer unit 107 for arithmetic mean synthesis. FIG. 5 illustrates a case where four symbols (delay profiles $h_n(t)$, $h_{n-1}(t)$, $h_{n-2}(t)$ and $h_{n-3}(t)$) are held in the buffer unit 107, but this is by no means limited to four symbols.

The first symbol timing correction unit 119 is provided between the buffer unit 107 and the interpolation synthesis unit 108, and performs symbol timing correction prior to the interpolation synthesis in the interpolation synthesis unit 108.

That is to say, delay profiles (time domain signals) $h_n(t)$, $h_{n-1}(t)$, $h_{n-2}(t)$ and $h_{n-3}(t)$ held in the buffer unit 107 are subjected to a correction process in the first symbol timing correction unit 119, and the delay profiles having been subjected to that correction process are output to the interpolation synthesis unit 108.

FIG. 6A, FIG. 6B, FIG. 6C, FIG. 6D and FIG. 6E are drawings schematically illustrating interpolation synthesis, including change of the FFT time window position in the receiving apparatus according to the present embodiment. Here, FIG. 6A, FIG. 6B, FIG. 6C and FIG. 6D illustrate symbol n to symbol n−3, and, also, FIG. 6E illustrates what symbol n to symbol n−3 are synthesized.

As illustrated in FIG. 6A, FIG. 6B and FIG. 6C, in symbols n, n−1 and n−2, the FFT time window position is "0," and, as illustrated in FIG. 6D, in symbol n−3, the FFT time window position is "K."

Then, for symbol n−3 where the FFT time window position is "K," for example, with reference to symbol n as the symbol of the present time, time correction for the change is performed to adjust to the FFT time window position "0" of that symbol n.

That is to say, as illustrated in FIG. 6D, based on delay profile $h_{n-3}(t-K+K)$, the first symbol timing correction unit 119 moves waveform W12 and W20 of symbol n−3 in the direction that is earlier in time by K and corrects them to the positions of waveform W11 and W21.

By this means, as illustrated in FIG. 6E, the interpolation synthesis unit 108 performs an arithmetic mean synthesis of delay profiles adequately, synthesizing the primary wave and the delayed wave, which are originally the same signal, at the same timing.

Furthermore, the noise cancelation unit 111 uses, for example, certain threshold value Ath0 and cancels noise by replacing paths that equal or fall below that threshold value with "0," and also the FFT unit 110 performs an FFT again and calculates a propagation path estimation value.

Then, the propagation path compensation unit 115 is able to perform propagation path compensation sufficiently using propagation path estimation value $H_n(f)$ from the FFT unit 110 and improve reception performance.

That is to say, according to the receiving apparatus of this first embodiment, FFT time window position information (symbol timing detection value tn) and symbol numbers are held in the symbol timing memory unit 118, and output to the first symbol timing correction unit 119.

Then, letting the input timing of received data to the propagation path compensation unit 115 be symbol n of the present time, the first symbol timing correction unit 119 performs time correction for the change for the delay profiles of past symbols in which the FFT time window position differs from that of symbol n.

By this means, the deterioration of delay profiles after the arithmetic mean synthesis by the interpolation synthesis unit 108 is reduced, so that the propagation path compensation unit 115 is able to perform propagation path compensation sufficiently and improve reception performance.

FIG. 7 is a drawing illustrating examples of symbol timings held in a symbol timing memory unit. Here, assume that the symbol timing of symbols n−4 to n−1 is "0" and the symbol timing of symbols n to n+3 is "K."

As illustrated in FIG. 7, first, for example, at time n, by which symbols are received up to symbol n, symbol n to symbol n−3 are the synthesis area (SA0), and symbols n−1, n−2 and n−3, in which the symbol timing differs from that of symbol n, are subject to correction.

Also, for example, at time n+1, by which symbols are received up to symbol n+1, symbol n+1 to symbol n−2 are the synthesis area (SA1), and symbols n−1 and n−2, in which the symbol timing differs from that of symbol n+1, are subject to correction.

Furthermore, for example, at time n+2, by which symbols are received up to symbol n+2, symbol n+2 to symbol n−1 are the synthesis area (SA2), and symbols n−1, in which the symbol timing differs from that of symbol n+2, is subject to correction. Note that the number of symbols to synthesize (by arithmetic mean synthesis) is not limited to four, as mentioned earlier.

Figure 8:
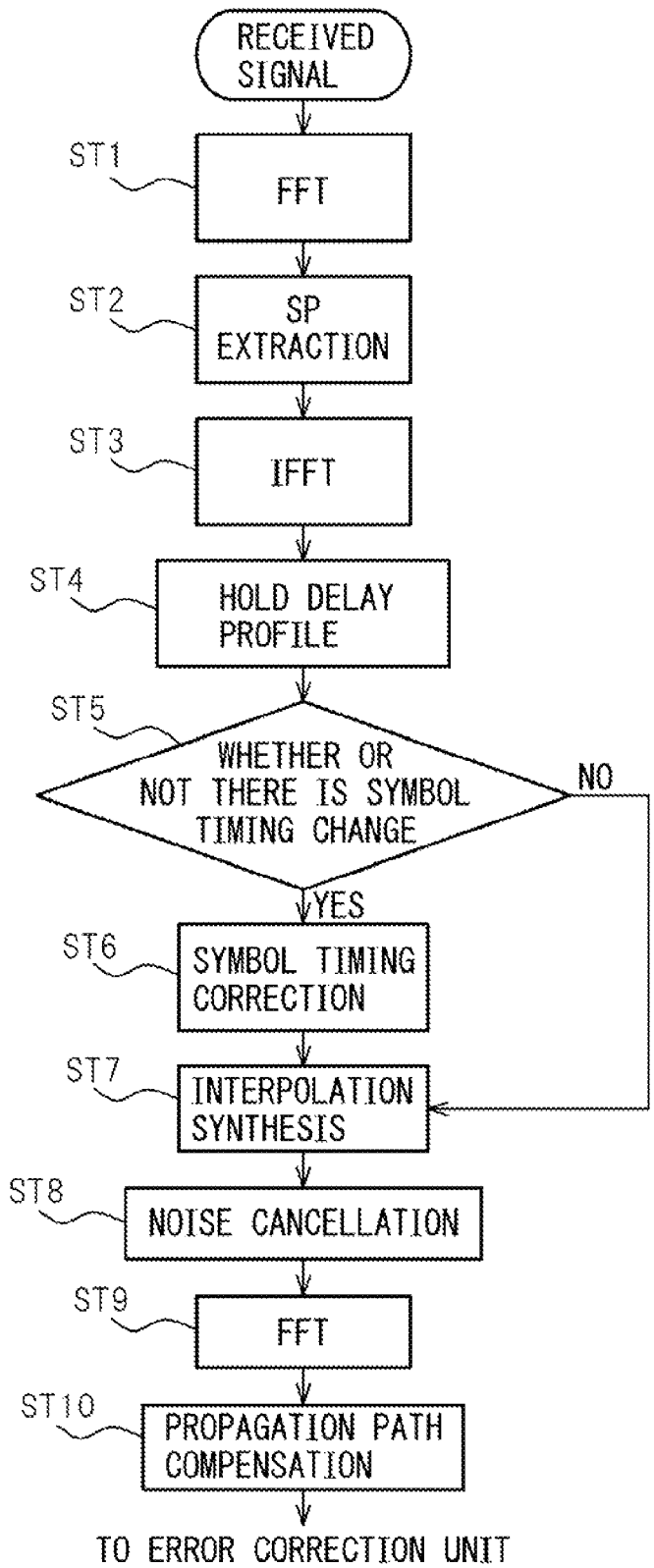
FIG. 8 is a flowchart for explaining a symbol timing correction process.

FIG. 8 is a flowchart for explaining the symbol timing correction process. First, when a received signal is captured, in step ST1, the FFT unit 104 performs an FFT (Fourier Transform) to convert the received signal into frequency domain signal $Y_n(f)$, and outputs frequency domain signal $Y_n(f)$, and the step moves on to step ST2.

In step ST2, the SP extraction unit 105 extracts the SP signal, and, moving on to step ST3, the IFFT unit 106 performs an IFFT (Inverse Fourier Transform). Furthermore, moving on to step ST4, the buffer unit 107 holds delay profiles (for example, $h_n(t)$, $h_{n-1}(t)$, $h_{n-2}(t)$ and $h_{n-3}(t)$), and the step moves on to step ST5.

In step ST5, whether or not there is symbol timing change is determined, and, if it is determined that there is symbol timing change, the step moves on to step ST6 in which the first symbol timing correction unit 119 performs symbol timing correction, and then the step moves on to step ST7. Note that the time correction for the change in the first symbol timing correction unit 119 has been described above.

On the other hand, in step ST5, if it is determined that there is not symbol timing change, the step moves on directly to step ST7. In step ST7, the interpolation synthesis unit 108 generates delay profile $h'_n(t)$ subjected to interpolation synthesis, and the step moves on to step ST8.

In step ST8, the noise cancelation unit 111 cancels noise, and, moving on to step ST9, the FFT unit 110 performs an FFT again and generates propagation path estimation value $H_n(f)$. Then, moving on to step ST10, the propagation path compensation unit 115 performs propagation path compensation using propagation path estimation value $H_n(f)$ from the FFT unit 110.

As described above, according to the receiving apparatus of this first embodiment, even when the FFT time window position in the initial stage has moved, it is still possible to improve reception performance by performing propagation path compensation sufficiently. That is to say, according to the receiving apparatus of this first embodiment, the performance deterioration when the FFT time window position has changed is reduced and stable reception is made possible.

Figure 9:
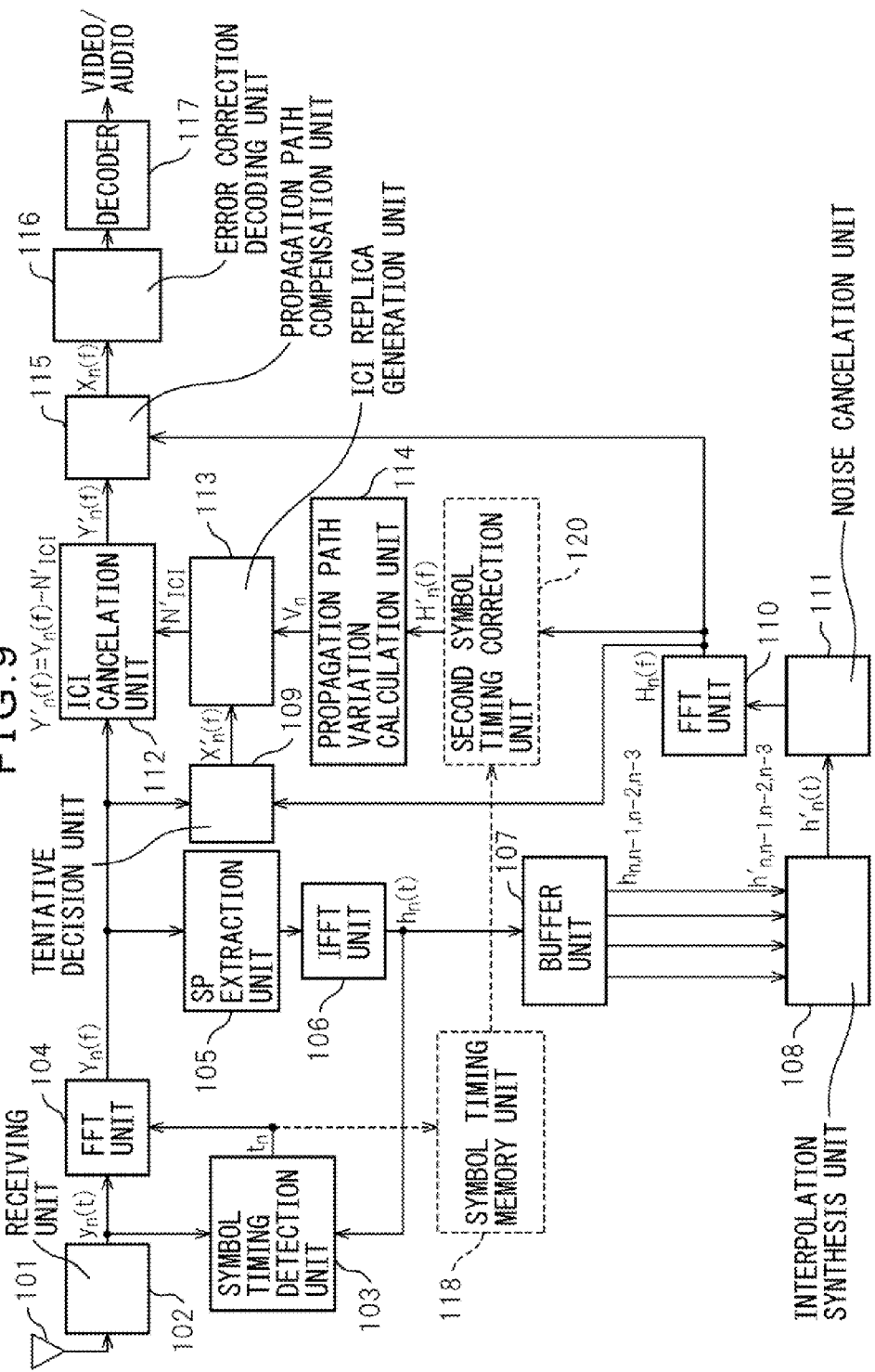
FIG. 9 is a block diagram illustrating a receiving apparatus according to a second embodiment.

FIG. 9 is a block diagram illustrating an example of a receiving apparatus according to a second embodiment, and, like FIG. 5, illustrates a receiving apparatus that complies with ISDB-T. As clear from the comparison of FIG. 9 and FIG. 1 described earlier, the receiving apparatus of this second embodiment adds a symbol timing memory unit 118 and a second symbol timing correction unit 120 to the receiving apparatus of related art illustrated in FIG. 1.

Similar to the first embodiment described earlier, the symbol timing memory unit 118 holds symbol timing detection value to detected in the symbol timing detection unit 103 with the symbol numbers.

However, the symbol timing memory unit 118 holds symbol timing detection values $t_n$ for symbols subject to the calculation of propagation path variation by the propagation path variation calculation unit 114 (for example, symbol n−1 which is one symbol earlier from symbol n, or symbols n−1 and n+1 which are earlier and later than the symbol n).

The second symbol timing correction unit 120 receives propagation path estimation value $H_n(f)$ from the FFT unit 110, corrects the amount of phase shift of the propagation path estimation value calculated prior to the ICI cancellation, and outputs propagation path estimation value $H'_n(f)$ with a corrected amount of phase shift, to the propagation path variation calculation unit 114.

Here, to cancel ICI component from each carrier of the OFDM signal, the ICI component of each carrier is estimated. This estimated ICI component ($N'_{ICI}$) is referred to as "ICI replica" and generated in the ICI replica generation unit 113.

That is to say, propagation path variation calculation unit 114 calculates propagation path variation value $V_n$ using propagation path information ($H'_n(f)$) of the earlier and later symbols, and outputs propagation path variation value $V_n$ to the ICI replica generation unit 113. The ICI replica generation unit 113 generates ICI replica $N'_{ICI}$ from hard decision value $X'_n(f)$ from the tentative decision unit 109 and propagation path variation value $V_n$, and outputs ICI replica $N'_{ICI}$ to the ICI cancelation unit 112.

Then, the ICI cancelation unit 112 estimates an ICI component based on a propagation path estimation value acquired from the data signal, and cancels the ICI of each carrier by subtracting ICI replica $N'_{ICI}$. That is to say, frequency domain signal $Y'_n(f)$ from which ICI is cancelled is found as $Y'_n(f)=Y_n(f)-N'_{ICI}$, and this is output to the propagation path compensation unit 115.

The propagation path compensation unit 115 performs a complex division of received data signal ($Y'_n(f)$) subjected to ICI cancelation in the ICI cancelation unit 112 by propagation path estimation value and, this causes to cancel the influence of the propagation path and to obtain equalized data signal $X_n(f)$.

This equalized data signal $X_n(f)$ is given to the error correction decoding unit 116, where error correction is executed, and a TS format signal is output. Then, the TS signal is input in the decoder 117, converted to a video/audio signal and output.

By the way, propagation path variation value $V_n$ is calculated using, for example, the earlier and later symbols. Assume that the input timing of received data (propagation path estimation value $H_n(f)$ from the FFT unit 110) to the propagation path compensation unit 115 is symbol n of the present time.

When, for example, the FFT time window position for symbol n−1, which is one symbol earlier, is different from that of symbol n, the second symbol timing correction unit 120 applies correction of the amount of phase shift of the propagation path estimation value to $H_{n-1}(f)$.

Then, the propagation path variation calculation unit 114 calculates the propagation path variation value corresponding to output data $Y_n(f)$ using propagation path estimation value $H_{n-1}(f)$ of the symbol that is one symbol earlier than propagation path estimation value $H_n(f)$ corresponding to output data $Y_n(f)$.

That is, letting the symbol timing of output data be symbol n, for the propagation path estimation value for symbol n−1, the amount of phase shift is corrected for the change of the FFT time window position from symbol n.

Note that, as for the method of calculating the propagation path variation value, for example, it is possible to use symbols earlier and later than the symbol n, namely symbols n+1 and n−1, and, in that case, the second symbol timing correction unit 120 executes correction of the amount of phase shift of the propagation path estimation values for symbols n+1 and n−1.

By the way, it is known that the amount of phase shift due to the change of the FFT time window position in one symbol of an OFDM signal is proportional to frequency and forms linear line of odd symmetry about the center carrier frequency of the OFDM signal.

That is to say, the amount of phase shift Δθ, may be represented by following equation (1):

$$\Delta\theta = -2\pi K(f-F_{used}/2)/N \quad (1)$$

Consequently, by executing correction of the amount of phase shift such as represented by following equation (2) for the propagation path estimation value of each carrier, propagation path information is calculated correctly and the accuracy of ICI cancellation improves.

$$H'(f)=H(f)\cdot\exp(j2\pi K(f-F_{used}/2)/N) \quad (2)$$

Figure 10:
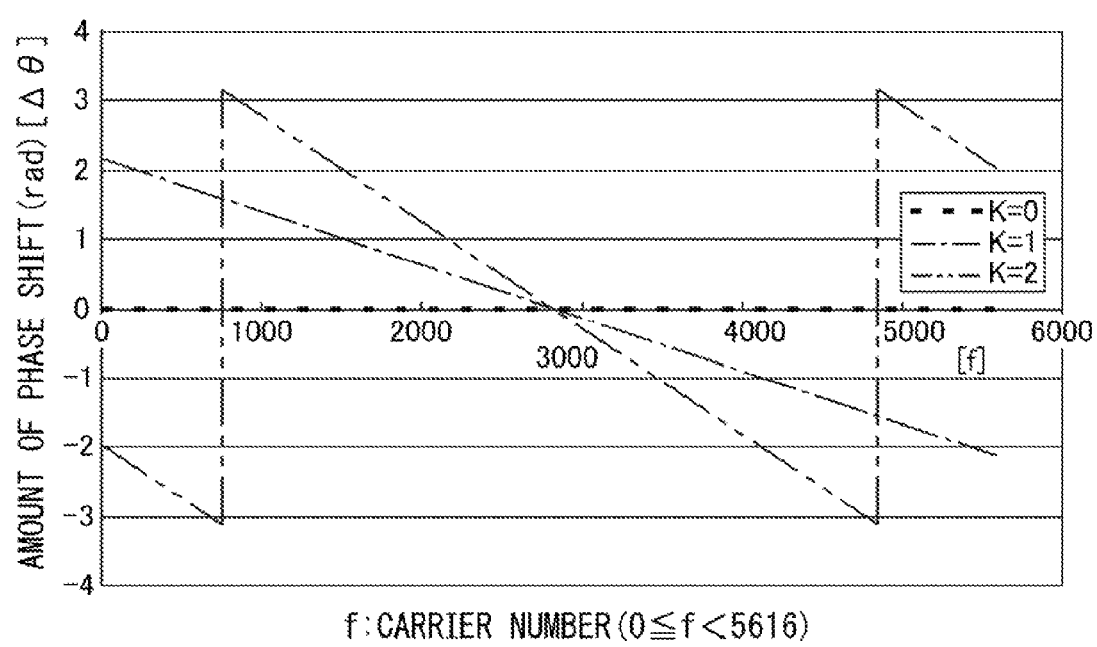
FIG. 10 is a drawing for explaining the amount of phase shift with respect to carrier numbers due to FFT time window position change.

The parameters in above equations (1) and (2) are as follows:

N: the number of FFT sampling
$F_{used}$: the total number of carriers
f: carrier number ($0 \le f < F_{used}$)
K: the amount of FFT time window position change FIG. 10 is a drawing for explaining the amount of phase shift with respect to carrier numbers due to FFT time window position change, and for explaining the correction of symbol timing for propagation path estimation values performed by the second symbol timing correction unit 120.

In FIG. 10, the horizontal axis represents the carrier number f and the vertical axis represents the amount of phase shift Δθ. Note that FIG. 10 illustrates the amount of phase shift Δθ in the event where the total number of carriers $F_{used}$ in one symbol is 5617 and the amount of FFT window position change K is 0, 1 and 2.

That is to say, as illustrated by the bold broken lines in FIG. 10, when K=0, the amount of phase shift Δθ (radian:rad) remains zero regardless of the carrier number f. Furthermore, as illustrated by the long-dashed single-dotted line in FIG. 10, when K=1, the amount of phase shift Δθ increases by the first inclination as the carrier number f parts farther from the median (5617/2=2808.5).

Likewise, as illustrated by the long-dashed double-dotted line in FIG. 10, when K=2, the amount of phase shift Δθ increases by a second inclination, which an inclination to double the first inclination, as the carrier number f parts farther from the median (2808.5).

In this way, for example, as when K=1 and 2, even if there is an amount of phase shift Δθ, the above-described second symbol timing correction unit 120 receives propagation path estimation value $H_n(f)$ from the FFT unit 110 and corrects the amount of phase shift Δθ.

Also, the propagation path variation calculation unit 114 receives as input propagation path estimation value $H'_n(f)$ subjected to correction of the amount of shift in the second symbol timing correction unit 120 and calculates propagation path variation value $V_n$, and, furthermore, the ICI replica generation unit 113 generates ICI replica $N'_{ICI}$ and inputs ICI replica $N'_{ICI}$ to the ICI cancelation unit 112.

Also, received data signal ($Y'_n(f)$), having been subjected to ICI cancellation in the ICI cancelation unit 112, is input to the propagation path compensation unit 115.

As described above, according to the receiving apparatus of this second embodiment, even in the event where the FFT time window position changes and phase rotation is produced, it is still possible to calculate propagation path variation value $V_n$ correctly and improve the accuracy of ICI cancellation. That is to say, according to the receiving apparatus of this second embodiment, it is possible to improve performance even in the situation where the FFT time window position is prone to change.

FIG. 11 is a block diagram illustrating a receiving apparatus according to a third embodiment. As clear from the comparison between FIG. 11 and, FIG. 5 and FIG. 9 described earlier, the receiving apparatus of this third embodiment adds the configuration of both the first embodiment and the second embodiment.

That is to say, as illustrated in FIG. 11, the receiving apparatus of the third embodiment adds a symbol timing memory unit 118, a first symbol timing correction unit 119 and a second symbol timing correction unit 120 to the receiving apparatus of related art illustrated in FIG. 1.

Furthermore, the receiving apparatus of this third embodiment has both the configuration of the first embodiment, which has been described with reference to FIG. 5, FIG. 6, FIG. 7, and FIG. 8, and the configuration of the second embodiment, which has been described with reference to FIG. 9 and FIG. 10, and therefore is able to improve reception performance even better.

Consequently, according to the receiving apparatus of the this third embodiment, even when the FFT time window position in the initial stage has moved, it is still possible to perform propagation path compensation sufficiently, and, furthermore, it is possible to improve the accuracy of ICI cancellation even in the event where the FFT time window position changes and phase rotation is produced.

That is to say, according to the receiving apparatus of this third embodiment, the performance deterioration when the FFT time window position has changed is reduced and stable reception is made possible, and, furthermore it is possible to improve reception performance even in the situation (for example, multipath environment) where the FFT time window position is prone to change.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving apparatus comprising:
a symbol timing detector configured to detect a Fourier transform start position from a received transmitting signal of a symbol unit;
a Fourier transformer configured to perform a Fourier transform using the detected Fourier transform start position;
a first symbol timing corrector configured to calculate and correct an amount of change between the Fourier transform start position of a reference symbol and the detected Fourier transform start position;
an interpolation synthesizer configured to perform an interpolation synthesis of a plurality of delay profiles corresponding to a plurality of symbols including the reference symbol and a symbol in which the amount of change is corrected; and
a symbol timing memory configured to hold Fourier transform start positions of the plurality of symbols with symbol numbers for the number of symbols subject to the interpolation synthesis.

2. The receiving apparatus as claimed in claim 1, wherein with respect to a symbol, in which a Fourier transform start position of a different timing from the Fourier transform start position of the reference symbol is detected, among the plurality of symbols, the first symbol timing corrector calculates the amount of change from the Fourier transform start position of the reference symbol, and performs a time correction for the change of the delay profile.

3. The receiving apparatus as claimed in claim 1, the receiving apparatus further comprising:
a propagation path compensator configured to compensate a propagation path according to the delay profiles subjected to the interpolation synthesis.

4. The receiving apparatus as claimed in claim 1, the receiving apparatus further comprising:
a second symbol timing corrector configured to calculate an amount of change between the Fourier transform start position of the reference symbol and the detected Fourier transform start position, and correct an amount of phase shift of a propagation path estimation value; and
a propagation path variation calculator configured to calculate a propagation path variation value using the corrected propagation path estimation value.

5. A receiving apparatus comprising:
a symbol timing detector configured to detect a Fourier transform start position from a received transmitting signal of a symbol unit;
a Fourier transformer configured to perform a Fourier transform using the detected Fourier transform start position;
a second symbol timing corrector configured to calculate an amount of variation between the Fourier transform start position of a reference symbol and the detected Fourier transform start position, and correct an amount of phase shift of a propagation path estimation value;
a propagation path variation calculator configured to calculate a propagation path variation value using the corrected propagation path estimation value; and
a symbol timing memory configured to hold Fourier transform start positions of the plurality of symbols with symbol numbers for the number of symbols subject to the interpolation synthesis.

6. The receiving apparatus as claimed in claim 5, wherein with respect to a symbol, in which a Fourier transform start position of a different timing from the Fourier transform start position of the reference symbol is detected, among the plurality of symbols, the second symbol timing corrector corrects the amount of phase shift of the propagation path estimation value.

7. The receiving apparatus as claimed in claim 5, the receiving apparatus further comprising:
an inter-carrier interference canceller configured to cancel inter-carrier interference according to the calculated propagation path variation value.

8. A receiving method comprising:
detecting a Fourier transform start position from a received transmitting signal of a symbol unit;
performing a Fourier transform using the detected Fourier transform start position;
calculating and correcting an amount of change between the Fourier transform start position of a reference symbol and the detected Fourier transform start position;

holding Fourier transform start positions of a plurality of symbols with symbol numbers for the number of symbols subject to an interpolation synthesis; and performing the interpolation synthesis of a plurality of delay profiles corresponding to the plurality of symbols including the reference symbol and a symbol in which the amount of change is corrected.

9. The receiving method as claimed in claim 8, wherein with respect to a symbol, in which a Fourier transform start position of a different timing from the Fourier transform start position of the reference symbol is detected, among the plurality of symbols, the amount of change from the Fourier transform start position of the reference symbol is calculated, and a time correction for the change of the delay profile is performed.

10. The receiving method as claimed in claim 8, wherein the amount of change between the Fourier transform start position of the reference symbol and the detected Fourier transform start position is calculated, and an amount of phase shift of a propagation path estimation value is corrected, and the receiving method further comprises calculating a propagation path variation value using the corrected propagation path estimation value.

11. A receiving method comprising:

detecting a Fourier transform start position from a received transmitting signal of a symbol unit;

performing a Fourier transform using the detected Fourier transform start position;

calculating an amount of change between the Fourier transform start position of a reference symbol and the detected Fourier transform start position, and correcting an amount of phase shift of a propagation path estimation value;

holding Fourier transform start positions of a plurality of symbols with symbol numbers for the number of symbols subject to an interpolation synthesis; and calculating a propagation path variation value using the corrected propagation path estimation value.

12. The receiving method as claimed in claim 11, wherein the amount of phase shift of the propagation path estimation value is corrected with respect to a symbol, in which a Fourier transform start position of a different timing from the Fourier transform start position of the reference symbol is detected, among the plurality of symbols.

13. The receiving method as claimed in claim 11, the receiving method further comprising:

cancelling inter-carrier interference according to the calculated propagation path variation value.

* * * * *